United States Patent
Pesé et al.

(10) Patent No.: US 11,126,744 B2
(45) Date of Patent: Sep. 21, 2021

(54) SYSTEMS AND METHODS FOR PRESERVING THE PRIVACY OF COLLECTED VEHICULAR DATA

(71) Applicant: GM GLOBAL TECHNOLOGY OPERATIONS LLC, Detroit, MI (US)

(72) Inventors: Mert Dieter Pesé, Ann Arbor, MI (US); Evripidis Paraskevas, Royal Oak, MI (US); Fan Bai, Ann Arbor, MI (US); Massimo Osella, Troy, MI (US); Soheil Samii, Royal Oak, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 148 days.

(21) Appl. No.: 16/180,767

(22) Filed: Nov. 29, 2018

(65) Prior Publication Data
US 2020/0175193 A1    Jun. 4, 2020

(51) Int. Cl.
*G06F 21/00* (2013.01)
*G06F 21/62* (2013.01)

(52) U.S. Cl.
CPC .. *G06F 21/6245* (2013.01); *G06F 2221/2115* (2013.01)

(58) Field of Classification Search
CPC .............. G06F 2221/2115; G06F 21/6245
USPC ...................................................... 726/26
See application file for complete search history.

(56) References Cited

U.S. PATENT DOCUMENTS

| 10,032,368 | B1* | 7/2018 | Thompson | G06Q 30/0284 |
| 2013/0198849 | A1* | 8/2013 | Aad | G06F 8/33 726/26 |
| 2016/0335455 | A1* | 11/2016 | Mohan | G06F 21/6254 |
| 2017/0126680 | A1* | 5/2017 | Yusuf | H04L 63/10 |

* cited by examiner

*Primary Examiner* — Anthony D Brown
(74) *Attorney, Agent, or Firm* — Lorenz & Kopf LLP

(57) ABSTRACT

Methods and apparatus are provided for preserving privacy of data collected from a vehicle. In one embodiment, a method includes: receiving, by a processor, privacy preferences entered by a user of the vehicle; receiving, by the processor, the data collected from the vehicle; distorting, by the processor, the data; downsampling, by the processor, the distorted data based on the privacy preferences; and communicating, by the processor, the downsampled, distorted vehicle data to a third-party entity.

16 Claims, 4 Drawing Sheets

SYSTEMS AND METHODS FOR PRESERVING THE PRIVACY OF COLLECTED VEHICULAR DATA

INTRODUCTION

The technical field generally relates to data collection, and more particularly relates to data collection and preserving privacy of the data collected from a vehicle.

In order to operate, vehicles collect and store data relating to the vehicle. In some instances, third-party entities have an interest in viewing and evaluating such data. For example, third-party applications or services for insurance companies may request access to the data to automatically adjust premiums based on driving behavior. In another example, third-party applications or services for rental companies may request access to the data for tracking car usage and mileage. An honest, but curious third-party entity could violate certain laws or terms of service that protect the privacy of vehicle data.

Accordingly, it is desirable to provide methods and systems for preserving privacy of data collected from a vehicle while enabling the sharing of data with third-party entities. Furthermore, other desirable features and characteristics of the present invention will become apparent from the subsequent detailed description and the appended claims, taken in conjunction with the accompanying drawings and the foregoing technical field and background.

SUMMARY

Methods and apparatus are provided for preserving privacy of data collected from a vehicle. In one embodiment, a method includes: receiving, by a processor, privacy preferences entered by a user of the vehicle; receiving, by the processor, the data collected from the vehicle; distorting, by the processor, the data; downsampling, by the processor, the distorted data based on the privacy preferences; and communicating, by the processor, the downsampled, distorted vehicle data to a third-party entity.

In various embodiments, the privacy preferences include a rating of an app associated with the third-party entity.

In various embodiments, the privacy preferences include a storage time associated with the data.

In various embodiments, the method includes receiving privacy preferences from a vehicle manufacturer, and wherein the downsampling is based on the privacy preferences from the vehicle manufacturer. In various embodiments, the method includes computing a trustworthiness score of an app associated with the third-party entity based on the privacy preferences from the user and a rating imposed from the vehicle manufacturer, and wherein the downsampling is based on the trustworthiness score.

In various embodiments, the method includes receiving a risk factor associated with several data sources from the vehicle, and wherein the downsampling is based on the risk factor.

In various embodiments, the distorting is based on a differential privacy method.

In various embodiments, the differential privacy method is a Laplace mechanism.

In various embodiments, the method includes at least one of enabling and disabling apps available to the user for collecting the data based on the privacy preferences.

In various embodiments, the communicating is to an enabled app associated with the third-party entity.

In another embodiment, a server system for preserving privacy of data collected from a vehicle is provided. The system includes: a first non-transitory module configured to, by a processor, receive privacy preferences entered by a user of the vehicle; and a second non-transitory module configured to, by a processor, receive the data collected from the vehicle, distort the data, downsample the distorted data based on the privacy preferences, and communicate the downsampled, distorted data to a third-party entity.

In various embodiments, the privacy preferences include a rating of an app associated with the third-party entity.

In various embodiments, the privacy preferences include a storage time associated with the data residing in third-party servers.

In various embodiments, the first non-transitory module receives privacy preferences from a vehicle manufacturer, and wherein the second non-transitory module downsamples based on the privacy preferences from the vehicle manufacturer.

In various embodiments, the first non-transitory module computes a trustworthiness score of an app associated with the third-party entity based on the privacy preferences from the user and the privacy preferences from the vehicle manufacturer, and wherein the second non-transitory module downsamples based on the trustworthiness score.

In various embodiments, the second non-transitory module receives a risk factor associated with a data source of the vehicle, and downsamples based on the risk factor.

In various embodiments, the distorting is based on a differential privacy method.

In various embodiments, the differential privacy method is a Laplace mechanism.

In various embodiments, the first non-transitory module at least one of enables and disables apps available to the user for collecting the data based on the privacy preferences.

In various embodiments, the second non-transitory module communicates to an enabled app associated with the third-party entity.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
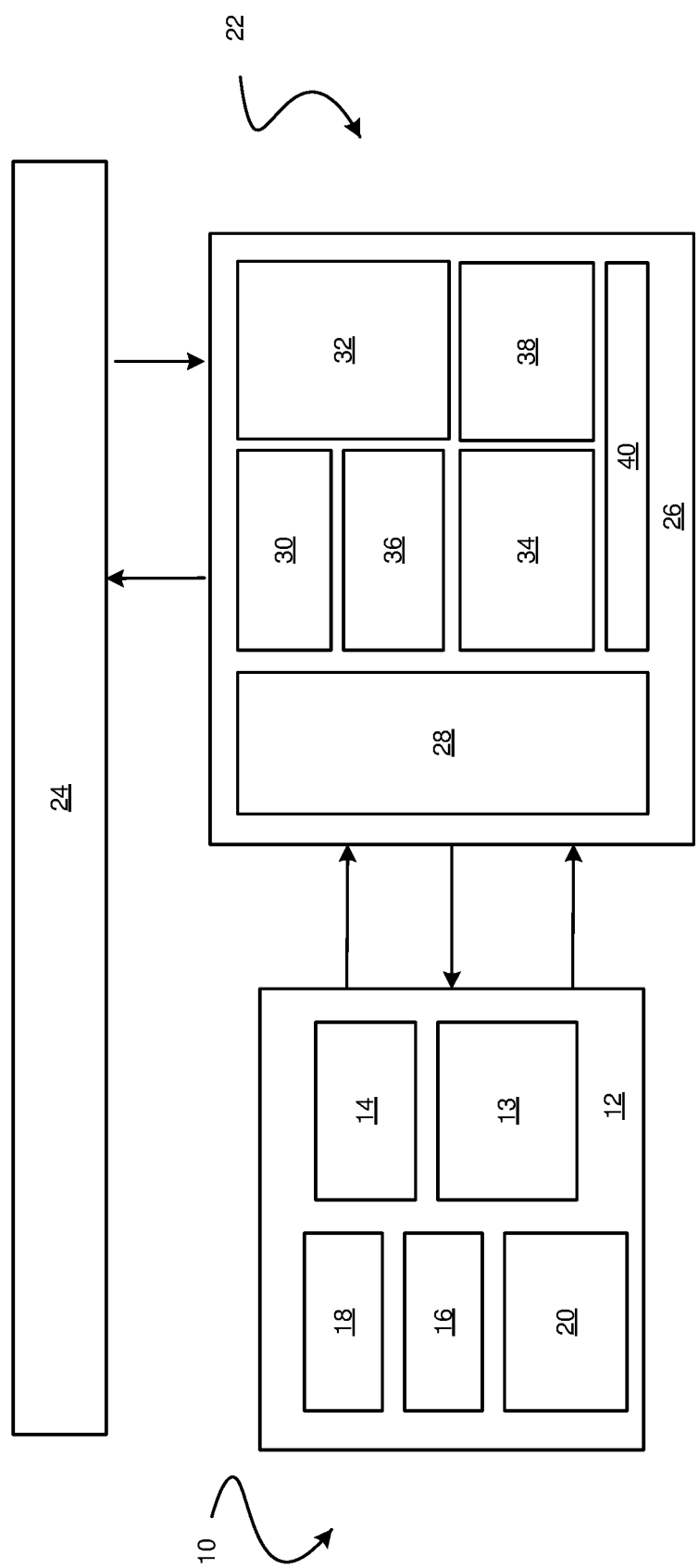
FIG. 1 is functional block diagram illustrating a vehicular data collection system including a privacy system in accordance with various embodiments.

With reference to FIG. 1, a data collection system 10 associated with a vehicle 12 is shown in accordance with various embodiments. The data collection system 10 includes a data collection module 13 that collects and stores data in a data storage device 14. The data is collected from various sensors 16, data from a communication bus 18, and/or data from other data sources 20 of the vehicle 12. For exemplary purposes, the disclosure will be discussed in the context of collecting data from the sensor 16.

In various embodiments, the data collection system 10 is associated with a privacy system 22 that enables access to third party entities 24 to the collected data while preserving certain defined privacy conditions. In general, the privacy system 22 enforces privacy by processing the collected data with a two-layer privacy protection scheme that sanitizes the collected data before sharing with third-parties. The privacy system 22 further enforces privacy based on user entered privacy settings.

In various embodiments, the privacy system 22 can be implemented separate from the vehicle 10 on, for example, a backend server 26 configured to communicate with the vehicle 12, other vehicles (not shown), and the third-party entities 24. For example, the backend server 26 includes a vehicle interface 28 that is configured to receive user privacy settings from the vehicle 12, to request data from the vehicle 12, and to receive requested data from the vehicle 12. In another example, the backend server 26 includes an entity interface 30 that is configured to transmit data to the third-party entities 24 and store information about third party apps in an app store 32.

In various embodiments, the privacy system 22 includes a privacy preferences module 34 and privacy services module 36. As will be discussed in more detail with regard to FIG. 2, the privacy preferences module 34 allows a user to define a desired level of privacy from privacy presets or personally customized configurations and stores the desired levels of privacy in a user account of a data storage device 38. The privacy preferences module 34 allows vehicle manufacturers (OEMs) to provide privacy levels for each of the apps entered through services/apps 40 of the backend server 26. Apps from the app store 32 that do not satisfy these desired levels of privacy are disabled for the user's vehicle 12.

As will be discussed in more detail with regard to FIG. 3, the privacy services module 36 processes the collected data from the vehicle 12 and varies the accuracy of the data and the frequency of the sampling of the data according to the user desired privacy levels and/or the OEM desired privacy levels.

Figure 2:
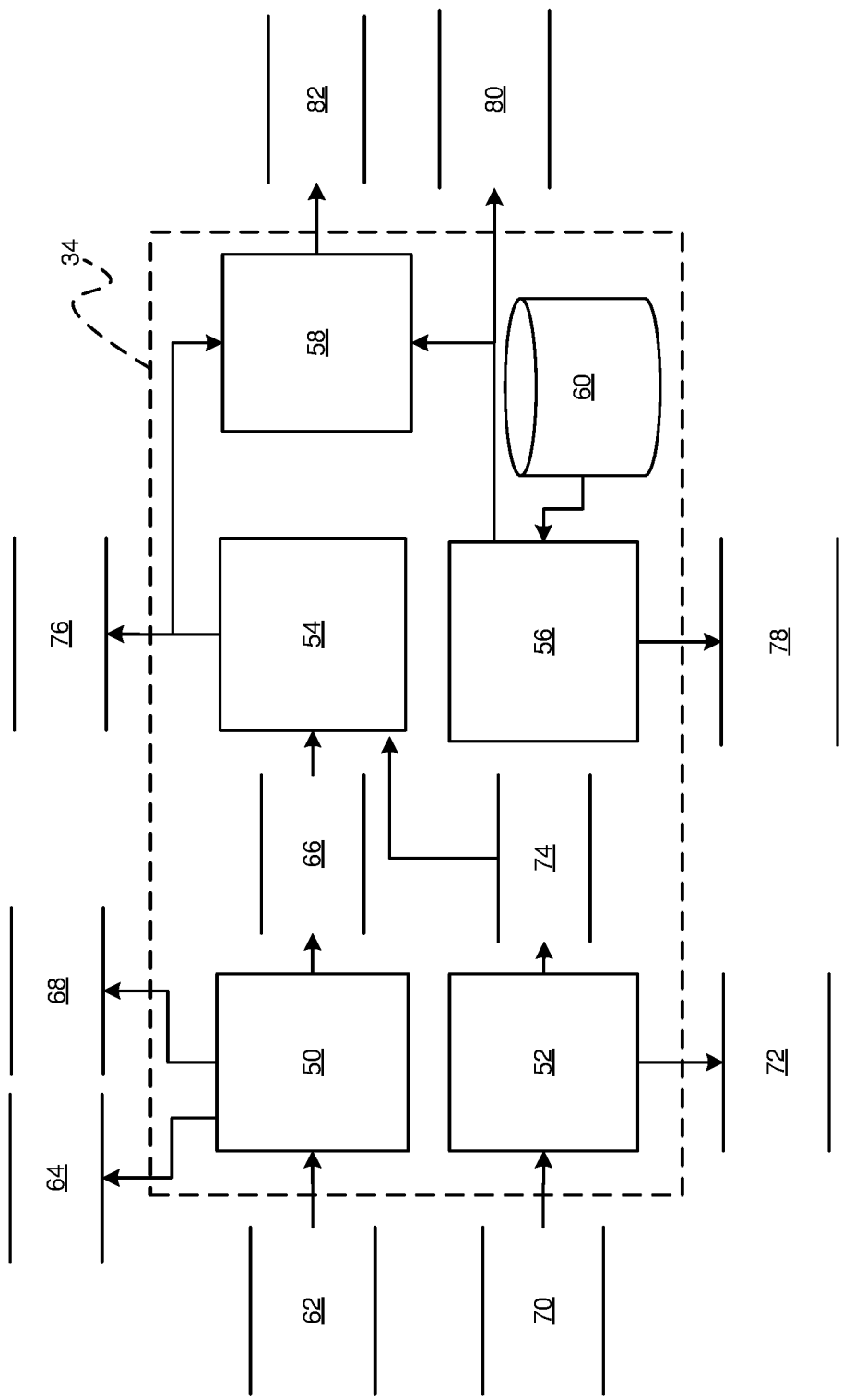
FIGS. 2 and 3 are dataflow diagrams illustrating the privacy system in accordance with various embodiments.

With reference now to FIG. 2, a dataflow diagram illustrates the privacy preferences module 34 in more detail in accordance with various embodiments. The privacy preferences module 34 can include any number of sub-modules. As can be appreciated, the sub-modules shown can be combined and/or further partitioned to allow for user defined privacy settings. In various embodiments, the privacy preferences module 34 includes a user preferences determination module 50, an OEM preferences determination module 52, a trustworthiness score determination module 54, a privacy risk factor determination module 56, an application enablement module 58, and a risk factor datastore 60.

The user preferences determination module 50 receives as input user privacy preferences data 62. The user privacy preferences data 62 may be received from the vehicle 12 and generated based on a user's interaction with an interface of the vehicle 12. The user preferences determination module 50 determines privacy preferences of the user based on the user privacy preferences data 62 and stores the privacy preferences in the data storage device 38 (FIG. 1). For example, in various embodiments, the user privacy preferences data 62 includes a user entered rating associated with a particular third-party app. The rating may be, for example, an integer value between 1 and 10. The user preferences determination module extracts the ratings and provides user ratings data 66 for further processing.

In another example, the user privacy preferences data 62 includes a user entered storage time associated with the third-party app. The storage time is a metric defining the amount of time the user allows the third-party entity to store their data. For example, after processing the third-party may be obligated to delete all user data. The user preferences determination module 50 extracts the storage time and provides storage time data 68 for further processing.

The OEM preferences determination module 52 receives as input OEM privacy preferences data 70. The OEM privacy preferences data 70 may be received from an OEM employee via interaction with an interface of the backend server 26. The OEM preferences determination module 52 determines privacy preferences of the OEM based on the OEM privacy preferences data 70 and stores the privacy preferences in the data storage device 38 (FIG. 1). For example, in various embodiments, the OEM privacy preferences data 70 includes an OEM entered rating associated with a particular third-party app. The rating may be, for example, an integer value between 1 and 3. For example, the OEM may rate apps that are available in the app store 32 (FIG. 1) from 1 to 3 based on the business relationship and trust with the developer of the app. The OEM preferences determination module 52 extracts the ratings and provides OEM ratings data 74 for further processing.

The trustworthiness score determination module 54 receives as input the user ratings data 66 and the OEM ratings data 4. Based on the inputs, the trustworthiness score determination module 54 determines a trustworthiness score associated with the third-party app and stores the trustworthiness score as trustworthiness score data 76 in the data storage device 38 (FIG. 1). For example, the trustworthiness score determination module 54 determines the trustworthiness score based on the following:

$$TS = \begin{cases} 1 - \left(1 - \frac{\beta}{10}\right) = \frac{\beta}{10} \\ 2 - \left(1 - \frac{\beta}{10}\right) = 1 + \frac{\beta}{10} \\ 3 - \left(1 - \frac{\beta}{10}\right) = 2 + \frac{\beta}{10} \end{cases} \quad (1)$$

Where β represents the user rating; and 1, 2, or 3 represents the OEM rating. An OEM rating of 1 indicates a new application or third-party service provider with background check passed, while 2 indicates a well-known service provider with credentials and 3 a service provider which has a special contract with the OEM.

The privacy risk factor determination module 56 receives as input sensor information data 78. The sensor information data 78 indicates the sensor(s) (or other data sources) selected by the app for data collection. The privacy risk factor determination module 56 determines the privacy risk factor of the sensor(s) indicated by the sensor information data 78. For example, the privacy risk factor determination module 56 is associated with the risk factor datastore 60 that stores predefined risk factors associated with each sensor (or other data source) of the vehicle 12. The risk factors can be a predefined value from 0 to 3 that is determined based on the sensors exposure to certain attack categories, such as but not limited to, driver fingerprinting, location inference, and driver behavior analysis. For example, an odometer may be assigned a risk factor of one since its data can be used for driver fingerprinting. In another example, a speed sensor may be assigned a risk factor of three since its data can be sued for driver fingerprinting, location inference, and driver behavior analysis. In still another example, a throttle position sensor may be assigned a risk factor of two since its data can be used for driver fingerprinting, and driver behavior analysis. As can be appreciated other sensor and other data sources can be assigned risk factors in various embodiments. The privacy risk factor determination module 56 provides the risk factor as risk factor data 80 for further processing.

The application enablement module 58 receives as input the trustworthiness score data 76 and risk factor data 80. The application enablement module 58 disables any apps stored in the app store 32 (FIG. 1) not satisfying the user privacy preferences indicated by the trustworthiness score and risk factor or other information entered by the user. The application enablement module 58 generates enablement/disablement data 82 that may be stored in the asp store 32 (FIG. 1) for enabling/disabling the apps for the user.

Figure 3:
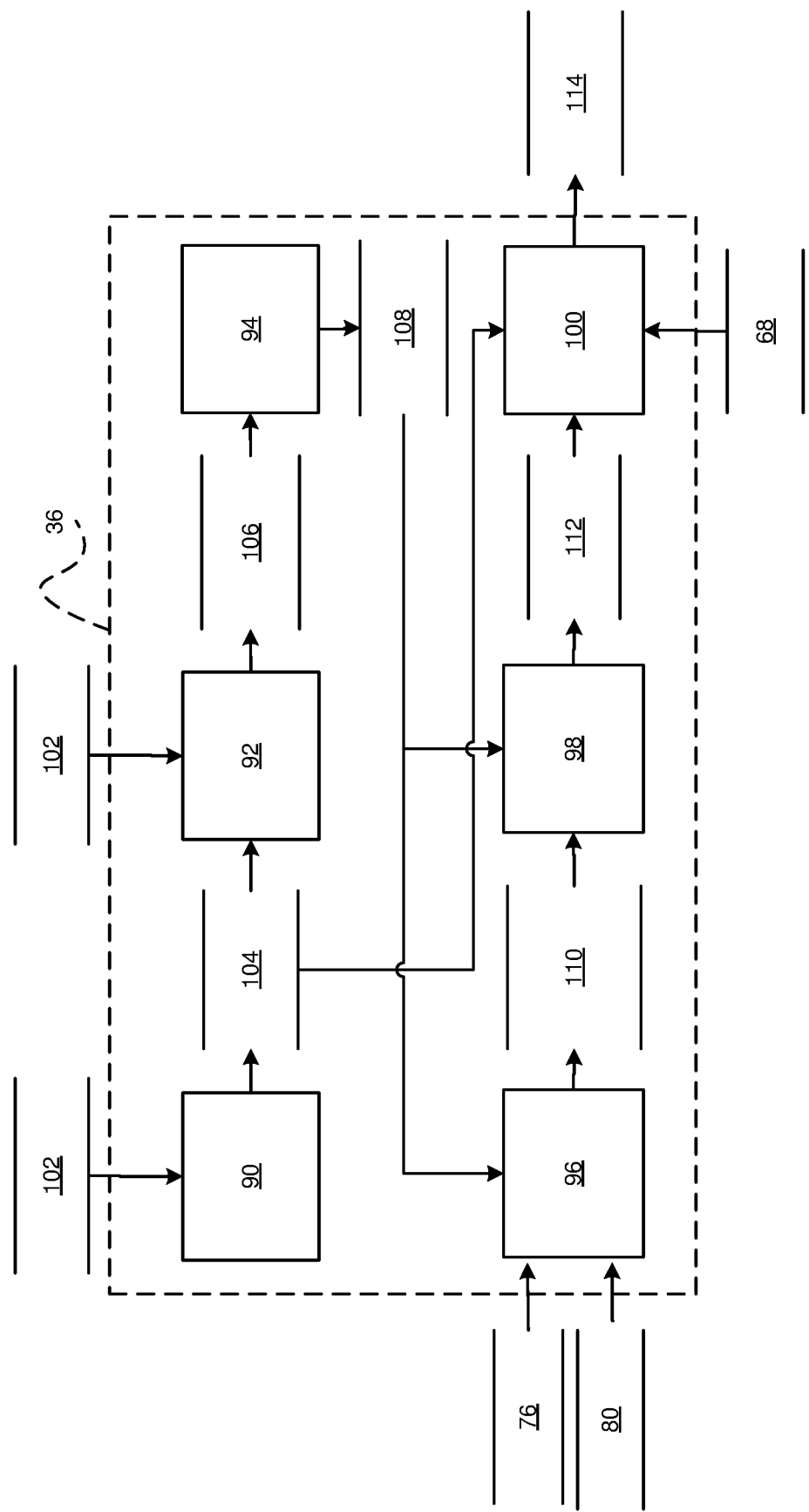

With reference now to FIG. 3, a dataflow diagram illustrates the privacy services module 36 in more detail in accordance with various embodiments. As can be appreciated, the privacy services module 36 can include any number of sub-modules. The sub-modules shown can be combined and/or further partitioned to allow for a two-layer privacy protection scheme when allowing third-party apps from the app store 32 (FIG. 1) access to the vehicle data. In various embodiments, the privacy services module 36 includes a distortion module 90, an error function module 92, an OEM budget calculation module 94, an application privacy budget calculation module 96, an application samples calculation module 98, and a sampling frequency module 100.

The distortion module 90 receives as input vehicle data 102 that is collected from the vehicle 12 (e.g., from the vehicle sensors 16, bus 16, or other data sources 20) as time series of data. The distortion module 90 distorts the collected data using, for example, differential privacy methods such as, but not limited to Laplace mechanism. The distortion module 90 generates distorted vehicle data 104 based on the distortion.

The error function module 92 receives as input the vehicle data 102 that is collected from the vehicle 12 (e.g., from the vehicle sensors 16, bus 16, or other data sources 20) and the distorted vehicle data 104. Based on the inputs, the error function module 92 computes an information loss metric (γ) and generates information loss metric data 106 based thereon. The information loss metric (γ), for example, measures the average relative error between the original time series of data X={$x_k$} and the distorted time series of the data R={$r_k$}, which are each N samples long. In various embodiments, the error function module 92 computes the information loss metric (γ) as:

$$\gamma = \frac{1}{N}\sum_{k=0}^{N-1}\frac{|rk - xk|}{\max\{xk, \delta\}}. \tag{2}$$

Where δ is a user specified constant (e.g., 1 or some other value) that mitigates the effect of small sensor values.

The OEM budget calculation module 94 receives as input the information loss metric data 106. The OEM budget calculation module 94 calculates an OEM privacy budget and generates OEM privacy budget data 18 based thereon. The OEM privacy budget is a maximum privacy budget that the OEM can grant to a third-party app. The privacy budget is a metric defining how many queries an third party entity can make on the collected data before they lose access. The minimum OEM privacy guarantee is subject to data accuracy requirements and is subtracted at each query from the privacy budget. For a given number of allowed data points NOEM which are shared with the third-party application, the OEM privacy budget can be calculated as:

$$bOEM = NOEM \varepsilon OEM. \tag{3}$$

Where εOEM represents the minimum OEM privacy guarantee which is subject to a sensor accuracy requirement provided by the OEM.

The application privacy budget calculation module 96 receives as input the trustworthiness score data 76 and the privacy risk factor data 80 generated by, for example, the privacy preferences module 34 of FIG. 2, and the OEM privacy budget data 108. The application privacy budget calculation module 96 calculates an application specific privacy budget based on the privacy factor (PRF) and the trustworthiness score (TS) of the received data and generates application privacy budget data 110 based thereon.

For example, the application privacy budget is calculated as:

$$bapp = \frac{bOEM}{(1 + PRF)(4 - TS)}. \tag{4}$$

In various embodiments, the application privacy budget ($b_{app}$) is always equal to or less than the OEM privacy budget ($b_{OEM}$).

The application samples calculation module 98 receives as input the OEM privacy budget data 108, and the application privacy budget data 110. The application samples calculation module 98 calculates the application samples and generates application samples data 112 based thereon. The application samples is the number of data points/samples that the third-party application is allowed to retrieve for the selected sensor. It is calculated using the number of allowed OEM data points NOEM:

$$Napp = \left\lfloor \frac{bapp}{bOEM}NOEM \right\rfloor. \tag{5}$$

As a result, the application specific samples are always equal to or smaller than the OEM samples which represent the case for a third-party app with minimal privacy risk (PRF=0, TS=1)

The sampling frequency module 100 receives as input the application samples data 112, the distorted data 104, and storage time data 68. The storage time data 68 was entered by a user and is provided by the privacy preferences module 34 (FIG. 2). The sampling frequency module 100 computes a sample frequency (fs) based on the application samples and the storage time for example as the application samples divided by the storage time. The sampling frequency calculation module 100 then applies the sample frequency to the distorted vehicle data 104 to provide downsampled data 114. The downsampled data 114 is then provided to the third-party entity or app.

Figure 5:
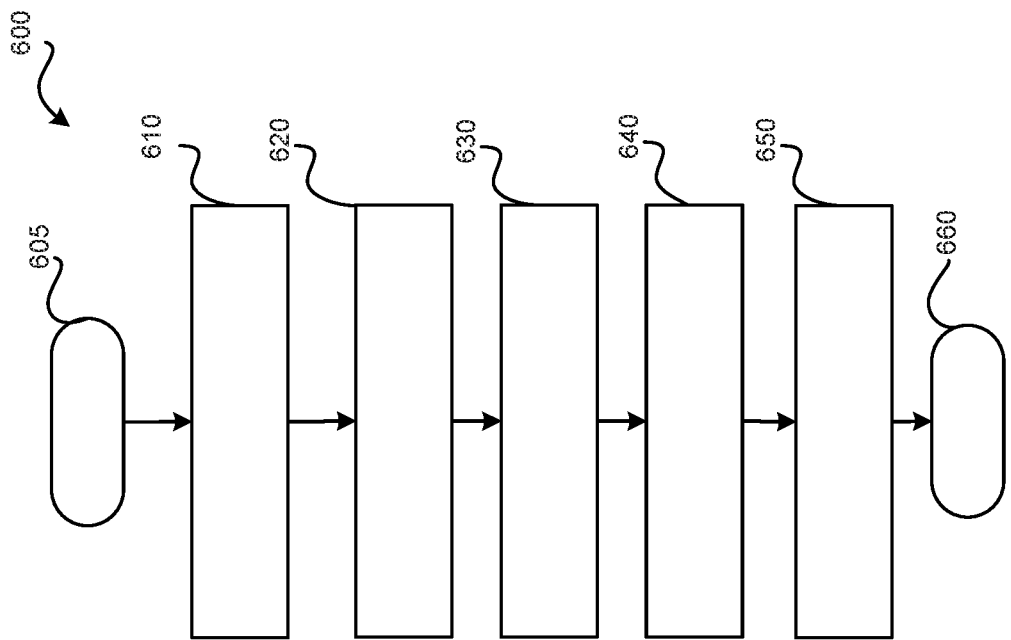
FIGS. 4 and 5 are flowcharts illustrating privacy preserving methods that may be performed by the privacy system in accordance with various embodiments.
Figure 4:
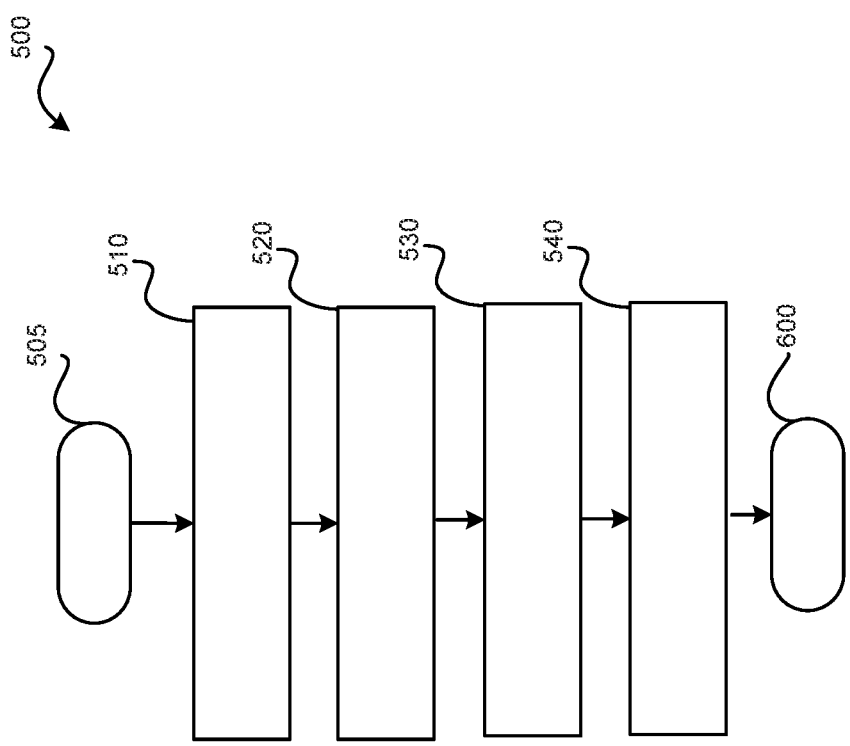

With reference now to FIGS. 5 and 6 and with continued reference to FIGS. 1-4, flowcharts illustrate methods of preserving privacy of vehicle data that may be performed by the system of FIGS. 1-4 in accordance with various embodiments. As can be appreciated in light of the disclosure, the order of operation within the methods is not limited to the sequential execution as illustrated in FIGS. 5 and 6 but may be performed in one or more varying orders as applicable and in accordance with the present disclosure.

In one example, a method 500 may begin at 505. At 510, user privacy preferences data 62 and OEM privacy preferences data 70 are received. A user account is created in the data storage device 38 and updated with the user privacy preferences 64 at 520. The trustworthiness score and risk factor are determined based on the user privacy preferences and the OEM privacy preferences and stored in the data storage device 38 at 530. The apps stored in the app store 32 are enabled/disabled for use by the user based on the user privacy preferences data 62 at 540. For example, the enable/disable filters are stored as metadata in the app store 32. Thereafter, the method may end at 550

In another example, a method 600 may begin at 605. A third-party app is selected from the enabled apps in the app store 32 and installed based on a user request at 610. Thereafter, data is obtained from the vehicle 12 based on the sensors (or other data sources) associated with the installed app at 620. For example, in various embodiments, data is requested from the vehicle 12 according to needed sensors indicated by the third-party app. The vehicle 12 collects and bundles the data for transmission. The data is transmitted to the backend server 26 form example, using cellular connection. As can be appreciated, the frequency of transmission heavily depends on the OEM or third-party app requesting data. If multiple apps are requesting data from the vehicle 12, the data might be bundled to be transmitted at the same time to reduce overhead. As can further be appreciated, other architectures and transmission methods may be used in various embodiments.

The vehicle data 102 is then distorted, for example as discussed above, at 630. The distorted data 104 is then downsampled, for example as discussed above using the user privacy preferences of the user, at 640. The distorted downsampled data is then transmitted to the third-party entity associated with the app or the app itself at 650. Thereafter, the method may end at 660.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of preserving privacy of data collected from a vehicle, comprising:
   receiving, by a processor, privacy preferences entered by a user of the vehicle, wherein the privacy preferences include a rating of an app associated with a third-party entity, and a storage time associated with the data collected from the vehicle;
   receiving, by the processor, the data collected from the vehicle;
   distorting, by the processor, the data;
   computing, by the processor, a trustworthiness score based on the rating of the app associated with the third-party entity;
   computing, by the processor, a privacy risk factor associated with at least one sensor selected by the app associated with the third-party entity for data collection;
   computing, by the processor, an application privacy budget based on the trustworthiness score and the privacy risk factor;
   downsampling, by the processor, the distorted data based on the application privacy budget and the storage time; and
   communicating, by the processor, the downsampled, distorted vehicle data to the third-party entity.

2. The method of claim 1, further comprising receiving privacy preferences from a vehicle manufacturer, and wherein the downsampling is based on the privacy preferences from the vehicle manufacturer.

3. The method of claim 2, wherein the computing the trustworthiness score is of the app associated with the third-party entity and is further based on a rating imposed from the vehicle manufacturer.

4. The method of claim 1, wherein the computing the privacy risk factor is based on risk factors associated with several data sources from the vehicle.

5. The method of claim 1, wherein the distorting is based on a differential privacy method.

6. The method of claim 5, wherein the differential privacy method is a Laplace mechanism.

7. The method of claim 1, further comprising at least one of enabling and disabling apps available to the user for collecting the data based on the privacy preferences.

8. The method of claim 7, wherein the communicating is to an enabled app associated with the third-party entity.

9. A server system for preserving privacy of data collected from a vehicle, comprising:
   a first non-transitory module configured to, by a processor, receive privacy preferences entered by a user of the vehicle, wherein the privacy preferences include a rating of an app associated with a third-party entity, and a storage time associated with the data collected from the vehicle; and
   a second non-transitory module configured to, by a processor, receive the data collected from the vehicle, distort the data, compute a trustworthiness score based on the rating of the app associated with the third-party entity, compute a privacy risk factor associated with at least one sensor selected by the app associated with the third-party entity for data collection, compute an application privacy budget based on the trustworthiness score and the privacy risk factor, downsample the distorted data based on the application privacy budget and the storage time, and communicate the downsampled, distorted data to the third-party entity.

10. The system of claim 9, wherein the first non-transitory module receives privacy preferences from a vehicle manufacturer, and wherein the second non-transitory module downsamples based on the privacy preferences from the vehicle manufacturer.

11. The system of claim 10, wherein the first non-transitory module computes the trustworthiness score of an app associated with the third-party entity and is further based on the privacy preferences from the vehicle manufacturer.

12. The system of claim 9, wherein the second non-transitory module computes the privacy risk factor based on risk factors associated with several data sources of the vehicle.

13. The system of claim 9, wherein the distorting is based on a differential privacy method.

14. The system of claim 13, wherein the differential privacy method is a Laplace mechanism.

15. The system of claim 9, wherein the first non-transitory module at least one of enables and disables apps available to the user for collecting the data based on the privacy preferences.

16. The system of claim 15, wherein the second non-transitory module communicates to an enabled app associated with the third-party entity.

\* \* \* \* \*